(12) United States Patent  (10) Patent No.: US 8,455,747 B2
Lozano, Jr.  (45) Date of Patent: Jun. 4, 2013

(54) MUSICAL LEARNING AID

(76) Inventor: Oscar Lozano, Jr., Arlington, TX (US)

( * ) Notice: Subject to any disclaimer, the term of this patent is extended or adjusted under 35 U.S.C. 154(b) by 398 days.

(21) Appl. No.: 12/986,495

(22) Filed: Jan. 7, 2011

(65) Prior Publication Data

US 2011/0167987 A1 Jul. 14, 2011

Related U.S. Application Data

(60) Provisional application No. 61/293,493, filed on Jan. 8, 2010.

(51) Int. Cl.
*G09B 15/02* (2006.01)
(52) U.S. Cl.
USPC ......... 84/471 R; 84/470 R; 84/474; 84/477 R
(58) Field of Classification Search
USPC ....................................... 84/471 R
See application file for complete search history.

(56) References Cited

U.S. PATENT DOCUMENTS

| 3,592,099 A * | 7/1971 | Gibby ............................. 84/473 |
| 3,728,932 A * | 4/1973 | Leonard ........................ 84/473 |
| 3,884,114 A * | 5/1975 | Leonard ..................... 84/471 R |
| 3,960,046 A * | 6/1976 | Choong ...................... 84/471 R |
| 4,716,806 A * | 1/1988 | Forrest ............................ 84/474 |
| 4,887,507 A * | 12/1989 | Shaw .............................. 84/474 |
| 5,288,234 A * | 2/1994 | Hamzi ......................... 434/404 |
| 5,370,539 A * | 12/1994 | Dillard ......................... 434/405 |
| 5,709,552 A * | 1/1998 | LeGrange ..................... 434/404 |
| 6,031,172 A * | 2/2000 | Papadopoulos ............. 84/470 R |
| 6,841,724 B2 * | 1/2005 | George ....................... 84/477 R |
| 2011/0185879 A1 * | 8/2011 | Cole .......................... 84/470 R |

* cited by examiner

*Primary Examiner* — Christopher Uhlir
(74) *Attorney, Agent, or Firm* — Sinorica, LLC

(57) ABSTRACT

A musical learning aid that help users learn and understand how musical pieces are composed. The present invention is able to help users understand how scales and chords are constructed. Additionally, the present invention can teach users which chords naturally lead to other notes allowing users to learn how to compose their own musical pieces.

20 Claims, 9 Drawing Sheets
(7 of 9 Drawing Sheet(s) Filed in Color)

MUSICAL LEARNING AID

The current application claims a priority to the U.S. Provisional Patent application Ser. No. 61/293,493 filed on Jan. 8, 2010.

FIELD OF THE INVENTION

The present invention relates generally to musical learning aid device. More specifically, the present invention is able to help users understand the process and formulas used to compose a musical piece regardless of instrument.

BACKGROUND OF THE INVENTION

The chromatic scale is the basis of all western civilizations music. All different kinds of music including classical or rock 'n roll are created from these twelve tones. The twelve tones of the chromatic scale form a single octave. A music scale is any useful division of an octave. The chromatic scale is all twelve notes in a row. For example, on a guitar if the sixth string open and travel down the string playing one fret at a time until you have reached the twelfth fret, an entire octave of the chromatic scale will have been played. The double dot on the twelfth fret signifies the start of the second octave. Proceeding on with the second octave will play the same tones or notes that repeat themselves at a higher pitch. Pitch is a way of describing the specific value of a tone. On guitar if you travel down the neck toward the body, you are going to a higher pitch, so you're going sharp. And if you travel up the neck toward the headstock, you are going to a lower pitch, you're going flat. This general rule also applies to a piano keyboard. If you go to the right on a keyboard, you're going to a higher pitch, sharp. If you go to the left you're going to a lower pitch, flat. Therefore if you play any note and travel to the right playing twelve notes in a row, this includes the black and white keys together until you end up on the same note you started on, which is the beginning of the next octave, you have just played the chromatic scale. All scales and chords are based on the chromatic scale.

For musicians to be able to describe one tone from another tone, these tones were given names. The letter method or sometimes call the Musical Alphabet is the standard. This is where seven letters from the English alphabet A thru G are assigned to certain tones. The keyboard layout is by far the easiest way to understand music theory. These seven main tones or notes are called naturals. On a piano keyboard, these are the white keys. The black keys that are in between the white keys have two letter names because they are related to both natural tones on each side. As the user goes towards the right of a keyboard, he is going sharp. As the user is going towards the left on the keyboards, he is going flat. This rule shows us how the black keys acquired their two names. For example, for the black key between the G and A, moving from G to the black key in the middle towards the right of G, makes the black key a G sharp. G sharp would be one of the two names for that black key. To reach the same black key from the A would require a left movement, making the black key also an A flat key. This makes G sharp the same exact note as an A flat. Generally, a scale that is made from flats like a minor scale or blue scale, the black keys are referred to by their flat letter names. Most major scales refer to the black keys by their sharp letter names. All the letter names are absolute, which means that these tones or notes always keep the same letter name regardless of the octave. There are relative ways of referring to notes. The Roman numeral method is also a common method.

Musical compositions make use of intervals as well. An interval is the musical distance between notes. If you play any note from the chromatic scale, and then play the note right next to it. This is a half step interval, the smallest possible interval. With two half steps equaling a whole step, this means a whole step is twice the distance of a half interval. Therefore, if a note is played and then next note played is the neighboring not of the initially played note, this is a whole step interval. When a note is sharpened, the pitch is raised up a half step. When a note is flattened, the pitch is lowered a half step. All scale formulas are written using intervals.

Scales are able to tell which chords are used in a musical piece and also set the overall mood of the piece. All music is composed using some form of a scale created from the twelve notes of the chromatic scale. Scales are constructed using different intervals between various notes with in an octave. By using different intervals combinations, scales acquired certain qualities that give each scale its own unique feel, or mood. The two most common scales are Major and minor scales. The Major is known as the happy scale because of its uplifting qualities. The minor scale is known as the sad scale because of its mournful qualities. There are three types of minor scales including natural, harmonic, and melodic scales. All scales start on one note and end on the same note one octave higher. The note selected to start a scale determines the key your scale will be in. This first note is also called the tonic. With twelve notes in the chromatic scale, there are twelve possible keys for every scale. Each key in itself has its own qualities. By selecting the right key the mood of a musical composition can be further enhanced. Scale formulas are written using half step and whole step intervals. Formulas tell us what notes of the chromatic scale are used and what notes are not used in a particular scale.

The present invention can be used on any musical instruments. In reference to FIGS. 6-7, the present invention also comprises a piano key chart, a piano key labeler, a guitar chord chart, and a guitar minor pentatonic scale chart. Other than a piano, the present invention can be applied to teach users how to play any other instruments. In addition to learning the scales and chords for the instruments, the users will also be able to learn how to make their own chord progressions for a musical piece.

The present invention is a learning aid that helps music students understand the formula behind the composition of music teaching the formulas of the different types of scales and the chords associated with them. The present invention allows users to learn the different scales and chords for every note of the chromatic scale.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAIL DESCRIPTIONS OF THE INVENTION

Figure 1:
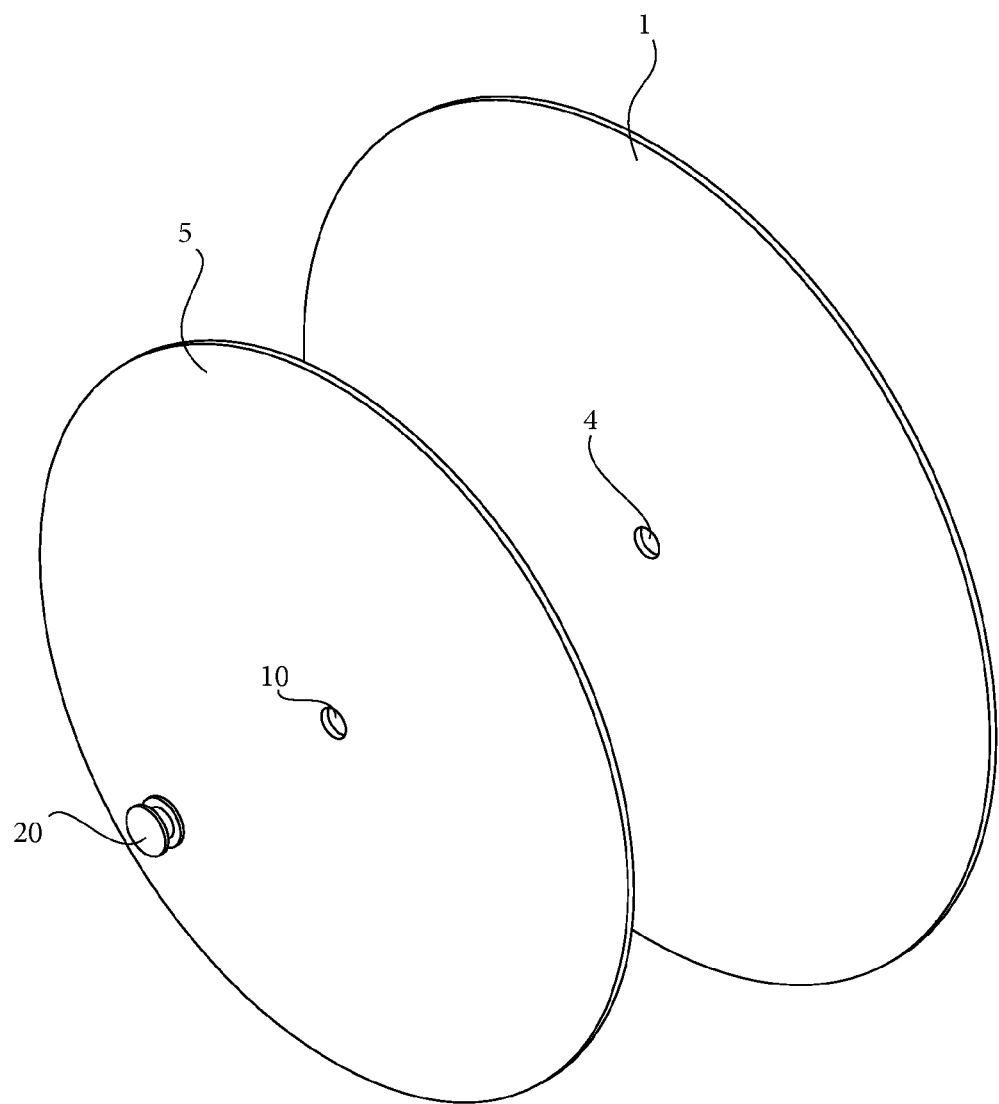
FIG. 1 is an exploded view of the present invention.

All illustrations of the drawings are for the purpose of describing selected versions of the present invention and are not intended to limit the scope of the present invention.

In reference to FIGS. 1-5, the present invention comprises an outer wheel 1, an inner wheel 5, and a pivot fastener 20. The outer wheel 1 is the component used to layout all of the notes in an octave and comprises a front side 2, a back side 3, and an outer pivot hole 4. The inner wheel 5 is the component of the present invention that provides all of the different formula patterns for the different types of scales and chords for each respective scale. The inner wheel 5 comprises a scale section 6, a chords section 7, a scale degree indicators 8, a plurality of half interval dividers 9, and an inner pivot hole 10. The inner wheel 5 is connected to the outer wheel 1 in an overlapping concentric fashion. The inner wheel 5 is able to tell a user how to play a scale or chord depending on the key or tonic.

Figure 2:
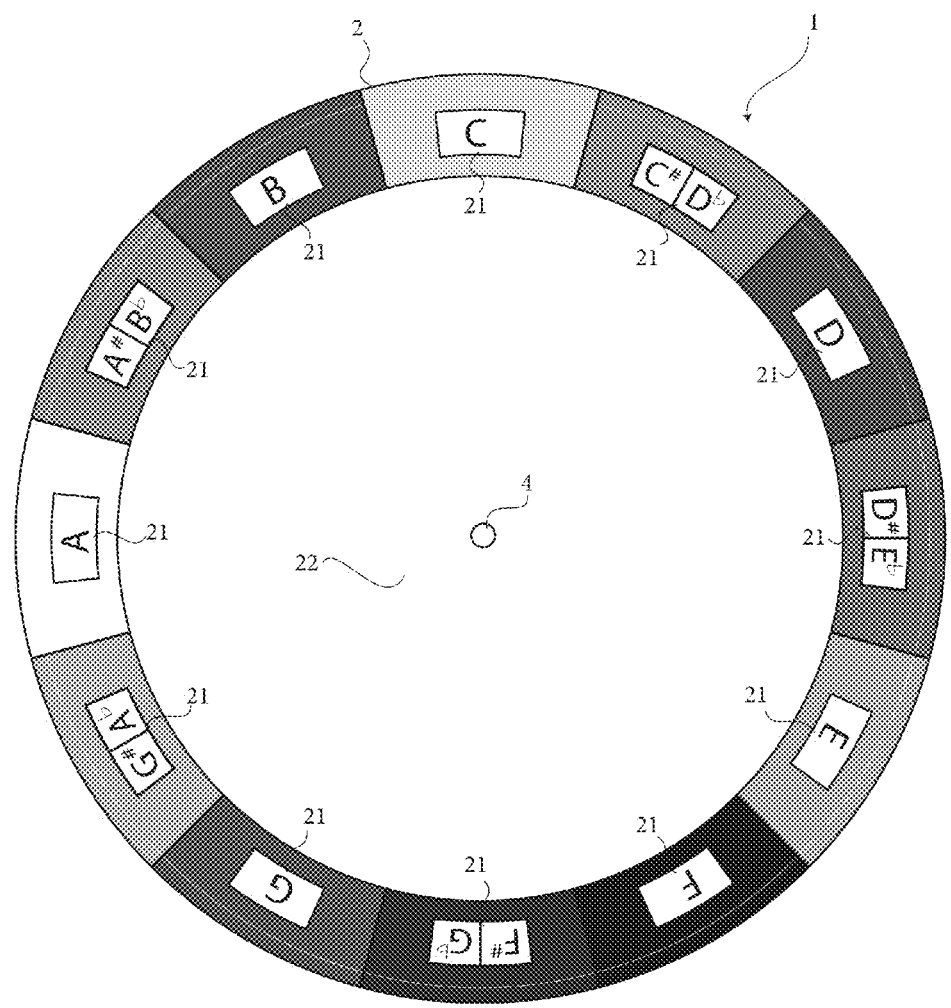
FIG. 2 is a front elevational view of the outer wheel of the present invention.

In reference to FIG. 2, the front side 2 of the outer wheel 1 comprises of an octave of notes 21 and an inner wheel circle 22. The octave of notes 21 includes the twelve notes for a single octave. The octave of notes 21 is evenly distributed along the circumference of front side 2 of the outer wheel 1. Centered on the front side 2 of the outer wheel 1 is the inner wheel circle 22. The inner wheel circle 22 is a blank circle that is sized to correspond to the inner wheel 5. The inner wheel circle 22 is defined by the octave of notes 21 bordering the outer wheel 1. In reference to FIG. 5, the back side 3 of the outer wheel 1 comprises a chord leading chart 31. The chord leading chart 31 is a chart that users can use as a reference to create chord progressions. Chord progressions are a series of harmonizing musical chords that aim for a definite goal. The outer pivot hole 4 is a hole that is positioned on the center and traverses through the outer wheel 1.

Figure 3:
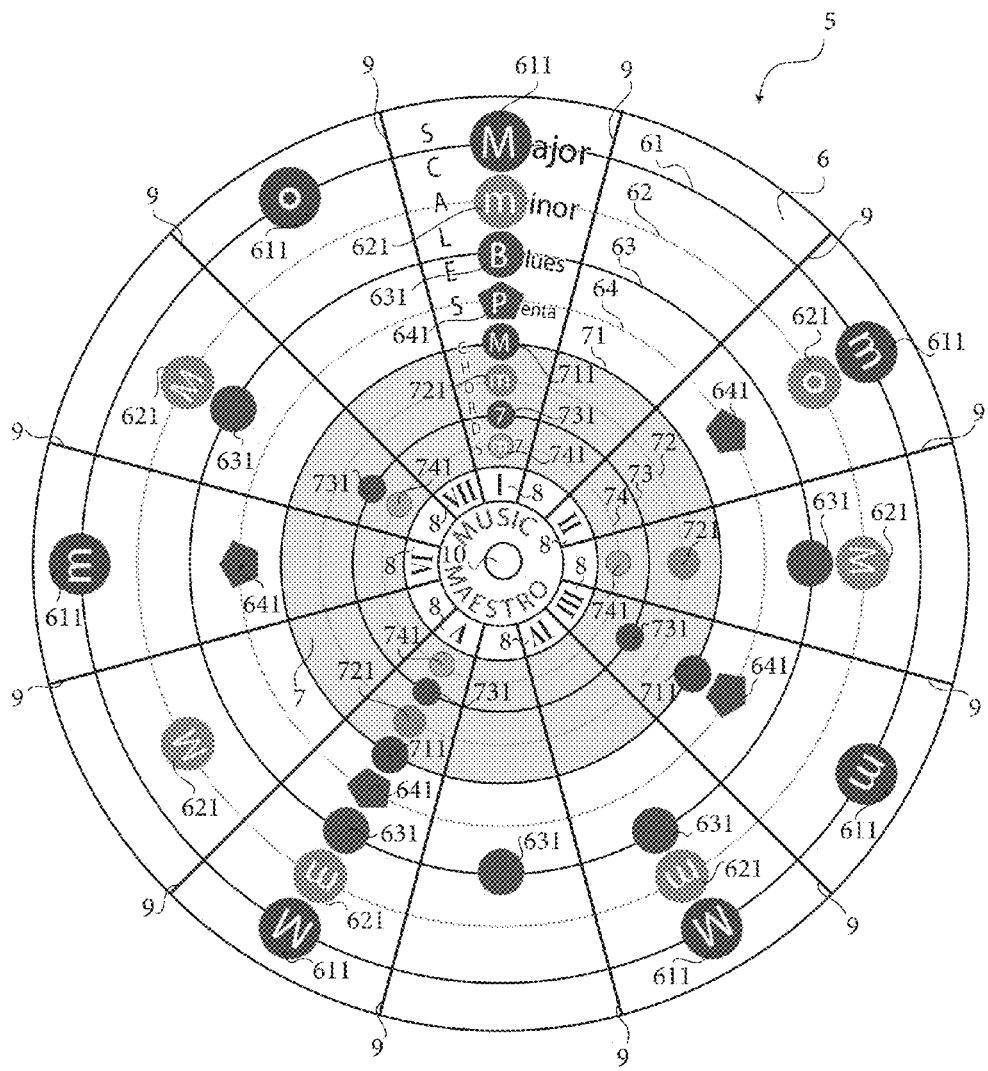
FIG. 3 is a front elevational view of the inner wheel of the present invention.

In reference to FIG. 3, the inner wheel 5 is the component of the present invention that is able to teach and help users understand the formula of the different types of scales and chords. For each type of scale and chord, regardless of the key, there is a set formula pattern. The plurality of half interval dividers 9 is lines that are equally distributed in radial relationship on the inner wheel 5. The number of half interval dividers 9 corresponds to the number of notes there are in an octave. The plurality of half interval dividers 9 helps divide the different intervals to isolate the notes that need to be played in a scale or chord on the scale section 6 and the chords section 7. The scale section 6 comprises a major scale circle 61, a minor scale circle 62, a blues scale circle 63, and a pentatonic scale circle 64. The chords section 7 comprises a Major chords circle 71, a minor chords circle 72, a sevenths chords circle 73, and a minor seventh chords circle 74. The scale section 6 is a circular ring shaped chart that shows all of the formulas for the different types of scales. The chords section 7 is a circular ring shaped chart that shows the formulas for the chords corresponding to each of the scales. The chords section 7 is enveloped and defined by the scale section 6. On the inside of the chords section 7 is positioned the scale degree indicators 8. The scale degree indicators 8 are positioned in concentric relationship to the chords section 7 and are defined by the plurality of half interval dividers 9. The inner pivot hole 10 similar to the outer pivot hole 4 on the outer wheel 1 is a hole that is positioned on the center and traverses through the inner wheel 5. As shown in FIG. 3, the major scale circle 61, the minor scale circle 62, the blues scale circle 63, and the pentatonic scale circle 64 are positioned in concentric relationship to each other. The different scale circles are evenly distributed along the radius segment defined by the scale section 6 to clearly show the different formulas for the different scales. The major scale circle 61 comprises a plurality of Major notes indicators 611. The plurality of Major notes indicators 611 are disposed along the major scale circle 61 between the plurality of half interval dividers 9. The plurality of Major notes indicators 611 are disposed in a major scale pattern formula of a whole step (hereafter defined as W), W, half step (hereafter defined as H), W, W, W, and H. The minor scale circle 62 comprises a plurality of minor notes indicators 621. The plurality of minor notes indicators 621 are disposed along the minor scale circle 62 between the plurality of half interval dividers 9. The plurality of minor notes indicators 621 are disposed in a minor scale pattern formula of W, H, W, W, H, W, and W. In the preferred embodiment of the present invention, although there are three different types of minor scales, the minor notes are only shown in the natural minor scale. However, in other embodiments, the present invention can also show the harmonic and melodic minor scales. The blues scale circle 63 comprises a plurality of blues notes indicators 631. The plurality of blues notes indicators 631 are disposed along the blues scale circle 63 between the plurality of half interval dividers 9. The plurality of blues notes indicators 631 are disposed in a blues scale pattern formula of a whole step and a half (hereafter defined as WH), W, H, H, WH, and W. The pentatonic scale circle 64 comprises a plurality of pentatonic notes indicators 641. The plurality of pentatonic notes indicators 641 are disposed along the pentatonic scale circle 64 between the plurality of half interval dividers 9. The plurality of pentatonic notes indicators 641 are disposed in a pentatonic scale pattern formula of W, W, WH, W, and WH. The Major chords circle 71, the minor chords circle 72, the sevenths chords circle 73, and the minor seventh chords circle 74 are positioned in concentric relationship to each other. The Major chords circle 71 comprises a plurality of Major chords indicators 711. The plurality of Major chords indicators 711 is disposed along the Major chords circle 71 between the plurality of half interval dividers 9. The plurality of Major chords indicators 711 are disposed in a major chords pattern formula. The minor chords circle 72 comprises a plurality of minor chords indicators 721. The plurality of minor chords indicators 721 are disposed along the minor chords circle 72 between the plurality of half interval dividers 9. The plurality of minor chords indicators 721 is disposed in a minor chords pattern formula. The sevenths chords circle 73 comprises a plurality of sevenths chords indicators 731. The plurality of sevenths chords indicators 731 are disposed along the sevenths chords circle 73 between the plurality of half interval dividers 9. The plurality of sevenths chords indicators 731 is disposed in a sevenths chords pattern formula. The minor sevenths chords circle 73 comprises a plurality of minor sevenths chords indicators 741. The plurality of minor sevenths chords indicators 741 are disposed along the minor sevenths chords circle 73 between the plurality of half interval dividers 9. The plurality of minor sevenths chords indicators 741 is disposed in a minor sevenths chords pattern formula.

In reference to FIG. 1, the inner wheel 5 is fastened to the outer wheel 1 by the pivot fastener 20. The inner wheel 5 is pivotable about the pivot fastener 20. The pivot fastener 20 fastens the inner wheel 5 to the outer wheel 1 by means of being inserted through the inner pivot hole 10 and the outer pivot hole 4. By connecting the inner wheel 5 to the outer wheel 1 in such a manner, the user is able to spin the inner wheel 5 to align the plurality of half interval dividers 9 to different keys. As the formula for the scales are consistent regardless of the key, the alignment of the half interval dividers 9 to different keys or tonics allows users to see how to play all the different kinds of scales and chords for the different keys.

Figure 8:
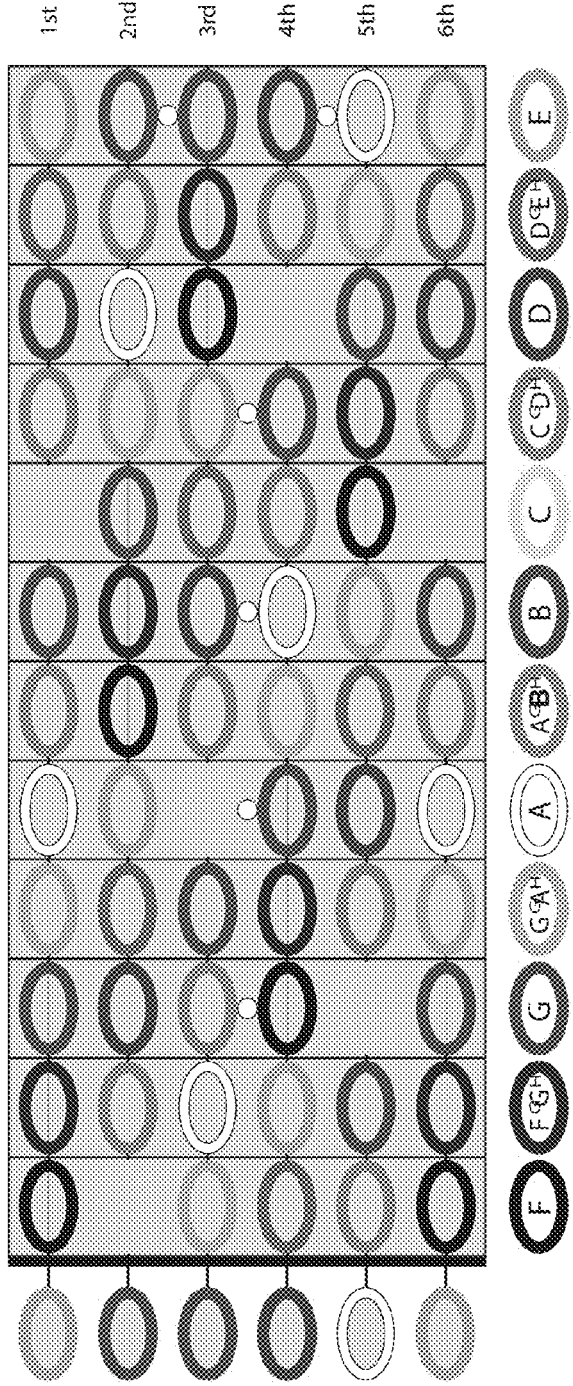
FIG. 8 is the guitar chord chart included with the present invention.

To use the present invention to learn the major scales, the user can align the plurality of half interval to a key. For example, for the C major scale, the tonic section or first note is aligned to the C note on the outer wheel 1. With the tonic section aligned to the C note, using the C major scale formula, the user will play all of the natural tones. The C major is coincidentally all natural tones due to the major scale formula. On the piano keyboard, the natural keys are all of the white keys. However, the present invention is applicable for the use on any other musical instruments including guitars or violins. On a piano keyboard the black keys are arranged in groups of twos and threes. If the black keys are used as landmarks, the note to the left of the two black keys is the C note. By playing each white key in order starting with the C note, the user can hear the familiar Do Re Mi Fa So La Ti Do. This is the Solfeggio method of using syllables to name musical tones. The Solfeggio method is a relative way of naming tones, meaning these syllables do not represent any specific tone. Regardless of the key for the major scale, the user will still be able to hear the Do Re Mi Fa So La Ti Do. Another method of designating tones is the use of numbers for each note in the major scale from one to seven. The numbering method is called the scale degrees, as shown by the scale degree indicators 8 on the inner wheel 5. The scale degree is a Roman numeral method, which like the Solfeggio is a relative way of naming tones. The first note of the scale will be numbered one, but only refers to the tone or key that the scale begins on. Scale formulas are fixed and never change. In the same manner, the scale formulas are only relative to the key that has been selected for the scale. Although the C major scale may include all of the natural tones, a major scale of another key may not include all natural tones. Using the inner wheel 5, the scale pattern will remain the same. However, the notes chosen by the inner wheel 5 for the major scale will be a whole new series of notes. Now we will transfer the major scale formula in the key of G to guitar. In reference to FIG. 8, we will show the major scale formula on one string even though scales are rarely played on just one string. But more likely notes would be transposed to a more convenient position. To transpose notes on guitar the user may simply go down to the string below the note you would like to transpose, and move five frets over going flat, toward the head stock. In reference to FIG. 8, you can see in our example, the same major scale formula pattern. In the preferred embodiment of the present invention, the plurality of Major notes indicator 611 is a series of red dots which are arranged using the major scale formula. By aligning the first position of the inner wheel 5, which has all formulas, to whatever key you have selected from the chromatic scale of the outer wheel 1. The red dots of the plurality of Major notes indicators 611 will align with which notes of the chromatic scale are to be included in the major scale. By choosing a major scale to create a musical piece, the user can insure that the musical piece will have an uplifting composition.

Figure 6:
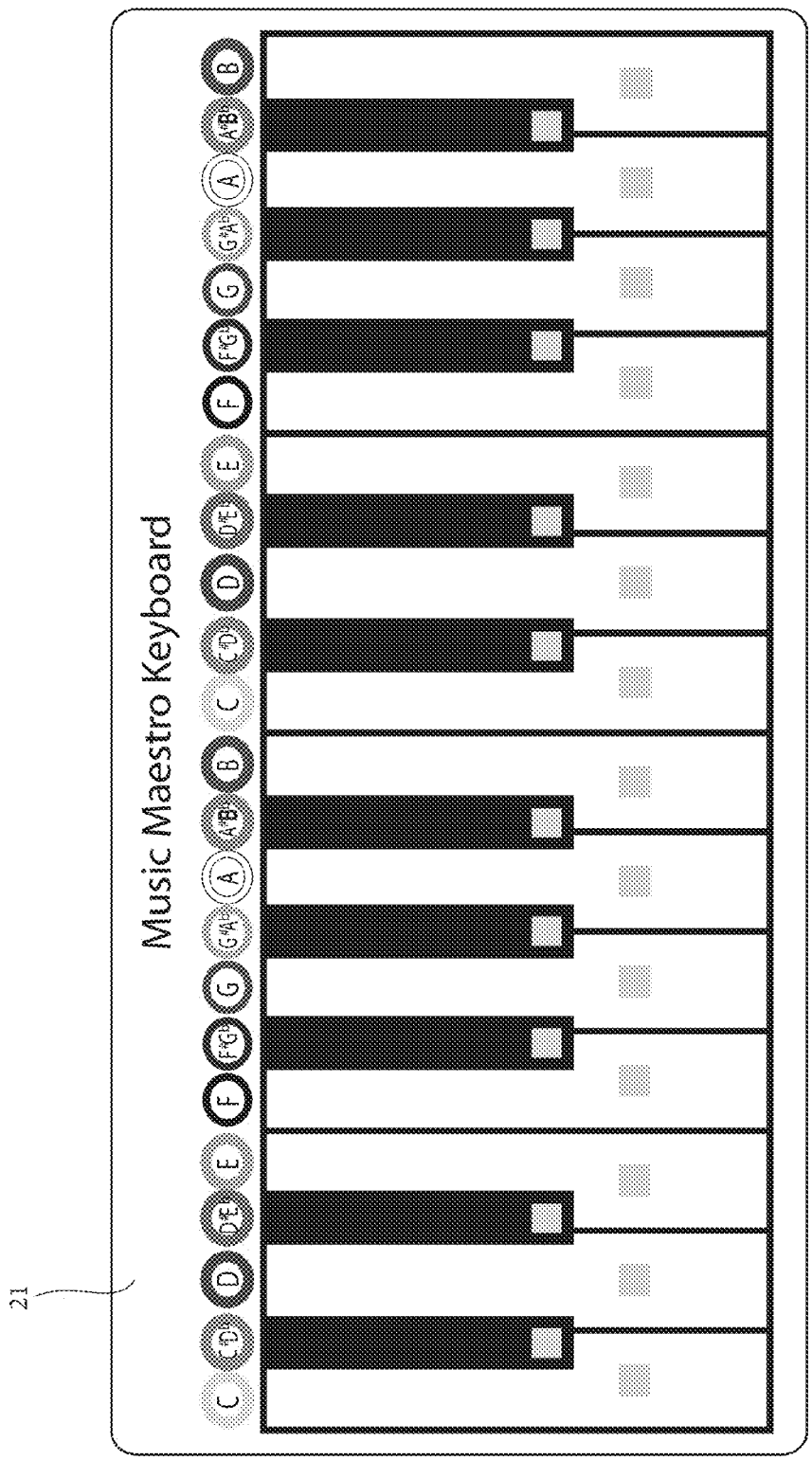
FIG. 6 is the piano key chart included with the present invention.
Figure 7:
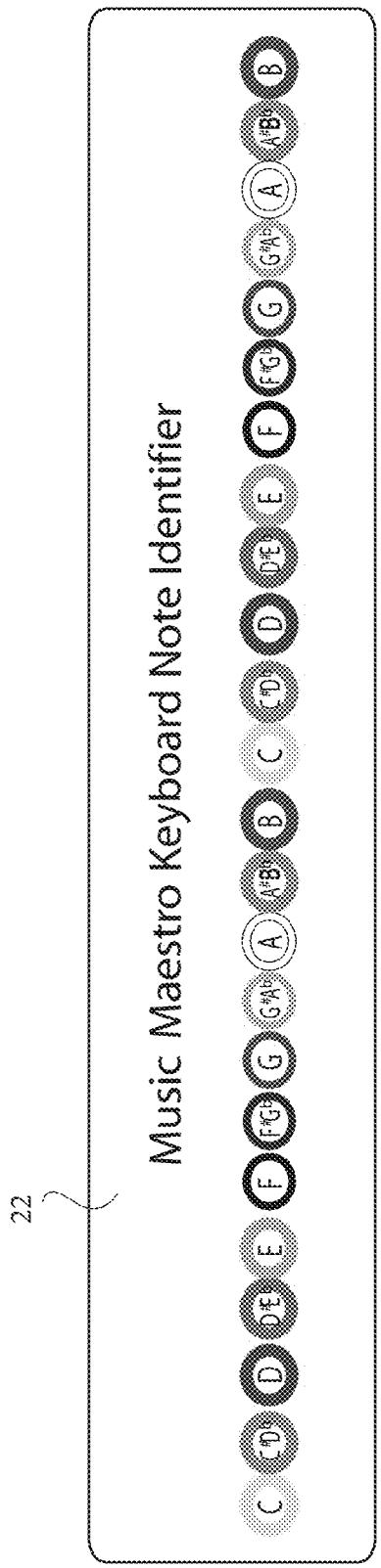
FIG. 7 is the piano key labeler included with the present invention.

The minor scale uses the same notes of the major scale, except for the third, sixth, and seventh are lowered a half step flat. It is these notes that give the minor scale it is mournful feel. We know the major scale in the key of C on keyboards is the white keys. In reference to FIG. 6, it is seen that by lowering the third, the sixth and seventh notes down a half step from the major scale, the notes of a minor scale in the key of C is obtained. The formula for the minor scale is whole step, half step, whole step, whole step, half step, whole step, and whole step. On the present invention, the plurality of minor notes indicators 621 is orange dots arranged using the minor scale formula. As stated earlier, the user can simply align the first position of the inner wheel 5 to the key selected from the chromatic scale on the outer wheel 1. The orange dots of the plurality of minor note indicators 621 will align with the notes of the chromatic scale that will be used in the minor scale. It is also important to notes that if a musical composition is in the key of C, it is assumed that it is a major scale. A minor scale composition has to be more specific. If the piece is based on a minor scale in the key of C, this song would be named in the key of C minor.

Figure 4:
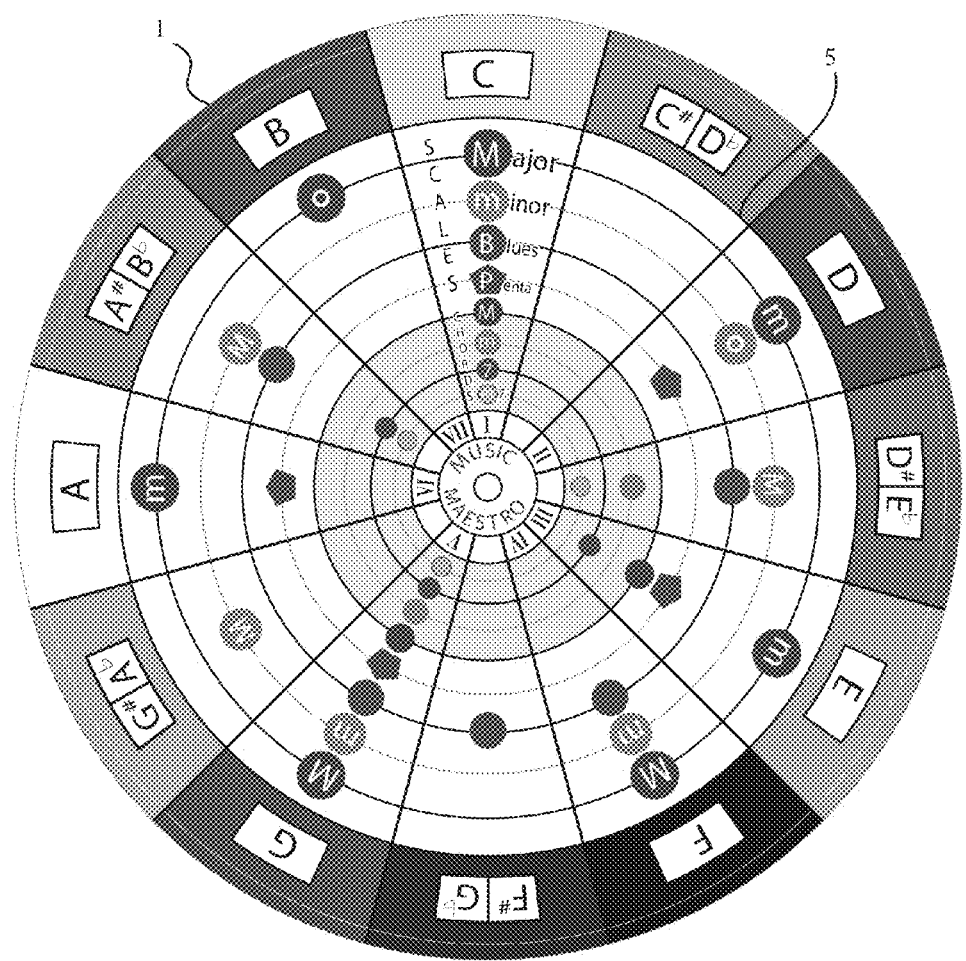
FIG. 4 is a front elevational view of the inner wheel assembled with the outer wheel.
Figure 5:
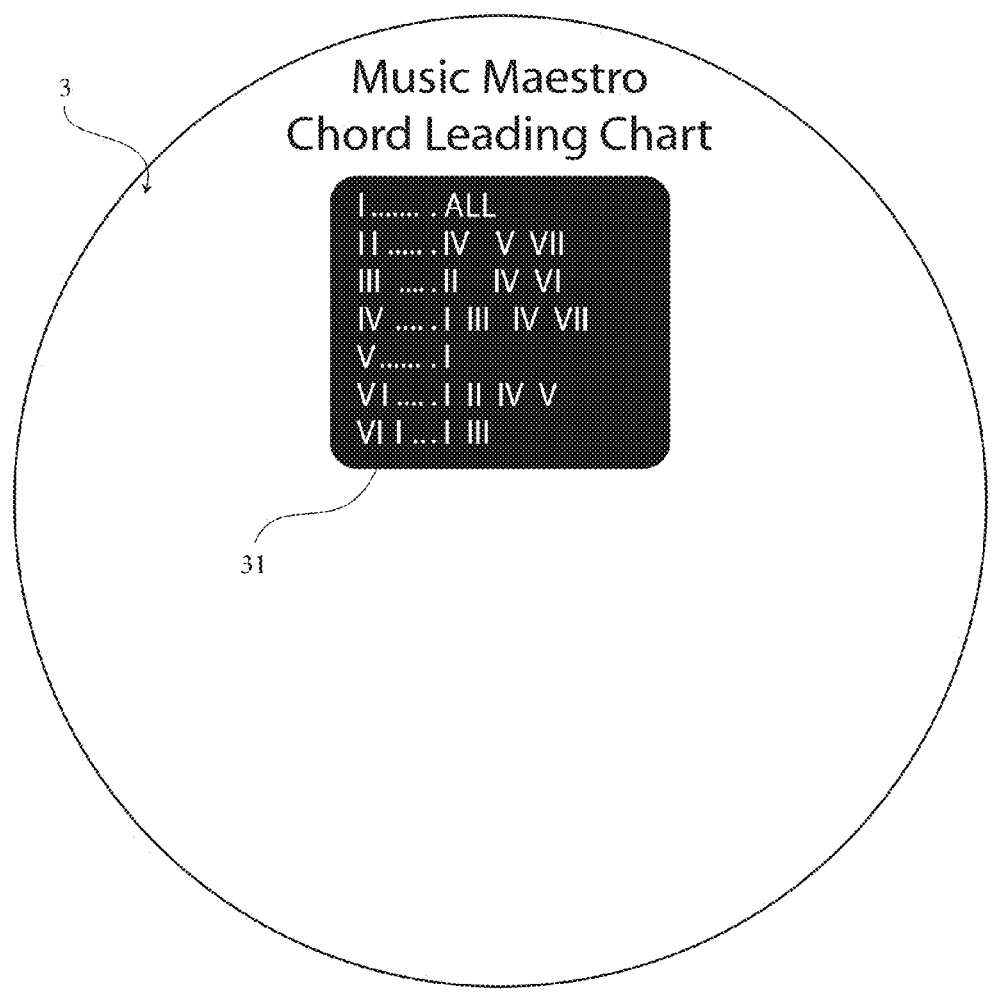
FIG. 5 is a rear elevational view of the outer wheel of the present invention.

The famous blues scale, considered by most to be the foundation of rock 'n roll, is one of today's more popular scales. This is due in part to its close relationship to the minor pentatonic scale, a favorite with guitar players all over the world. Just as the Major scale has a happy feel and the minor scale has a sad feel, the blues scale has a bluesy feel. The blues scale, with its unique interval combinations, has slightly larger intervals which can be written several ways if you move from one note to a note that is three notes away. This can be written as three half-steps or as a whole-step and a half-step. To make these less confusing larger intervals as whole-step-and-a-half (abbreviated as WH). The blues scale, like the minor scale, also has three flat notes—the third, fifth, and the seventh. The formula for the blues scale is whole-step and a half-step, whole-step, half-step, half-step, whole-step and a half-step, and whole-step. It is the flat fifth that really gives the blue scale the bluesy feel. As previously stated, the blue scale was closely related to the minor pentatonic scale. By removing the flat fifth of the blues scale, the scale is now converted into a minor pentatonic scale. In the preferred embodiment of the present invention, the plurality of blues notes indicator 631 is blue dots which are arranged using the blue scale formula, as shown in FIGS. 3-4. Similar to the major and minor scale, the alignment of the first position with the key from the chromatic scale selected allows users to play a blues scale. The blue dots will align with the notes of the chromatic scale to be used in the blue scale. To convert the blues scale into a minor pentatonic scale, the blues scale formula can be used by simply removing the flat fifth. The flat fifth is the note between the fourth and fifth note.

The pentatonic scale is considered The Country and Western scale. But it is also used in folk, and some rock 'n roll music as well. The word penta—means five, so the pentatonic scale is a five note scale. The pentatonic scale uses the first, second, third, fifth, and sixth notes within a Major scale. One may believe this will be limiting by having only five notes. However, the five notes of the pentatonic scale can be very versatile. There are several pentatonic scales to choose from. The present invention shows the most common pentatonic scale. A great method to hear the pentatonic scale is to play all the black keys on a piano keyboard. The pentatonic scale in the key of F sharp/G flat coincidentally works out to be all five of the black keys on a piano keyboard. Note that if the black keys are played in order, the result is an almost an Oriental sound. But by simply changing the order and alternating the notes played, the result is a completely different sound. This is especially the case if the notes are alternated in several octaves. The pentatonic scale, like the blue scale, also has slightly larger intervals. The pentatonic scale formula is a whole step—whole step—whole step and a half—whole step—whole step and a half. In the preferred embodiment of the present invention, the plurality of pentatonic notes indicators 641 is green five-sided shape. By aligning the first position with a selected key, the five-sided shapes will align with the chromatic notes to be used in the pentatonic scale. Included with the present invention is a labeled fretboard and keyboard chart to keep track of notes in a scale.

A chord is a combination of three or more notes played together. In the preferred embodiment of the present invention, the inner wheel 5 uses four of the most popular chord types, Major, minor, sevenths, and minor sevenths. Major and minor chords are three note chords call triads. A Major chord is based on a Major scale, so it will acquire the same uplifting feel of a Major scale. The Major chord formula uses the first, third, and fifth notes of the Major scale, which are arranged in thirds. The first note of the chord is called the Root. To make a C Major chord, the C note is the first, or root, and the E note is the third, and the G note is the fifth. So C, E, and G are the notes of a C Major chord. On the present invention, all chord formulas are positioned in the shaded area of the chords section 7. The Major chord formula, like the Major scale formula uses the red dots for the plurality of Major chords indicators 711. To find chords on the chords section 7 of the inner wheel 5, the same method used to find scale notes is used to find the notes of a chord. The user may simply align the first position of the inner wheel 5 with all the chord formulas to the root note of the chord for the selected key from the chromatic scale outer wheel 1. The red dots of the plurality of Major chords indicators 711 will align with the notes of the chromatic scale used in the Major chord of the selected key. A minor chord is based on a minor scale, so it will acquire the same mournful feel of a minor scale. The minor chord formula uses the first, the flat third and fifth notes of the minor scale. It is the flatted third, the middle note of the chord, that is separates a minor and Major chord. To make a minor chord into a Major chord, the third note can simply be sharpened or raised a half step. To make a Major chord into a minor chord, the third note can be flattened or lower a half step. On the present invention, minor chord formulas are represented by the orange dots of the plurality of minor chords indicators 721 in the shaded area of the chords section 7. Two other chord types are augmented chords and diminished chords. Although not included on the preferred embodiment of the present invention, they are closely related to Major and minor chords. These two types chords are made from the last note of a Major and minor chord, the fifth. An augmented chord is simply a major chord with a sharp, or raised fifth. A diminished chord is a minor chord with a flat or lowered fifth.

Although the Major and minor chords are three note triad chord, other chords may have more than three notes. These types of chords are called extensions, which are notes added to a basic triad in thirds, like sevenths, ninths, elevenths, and thirteenths. Chord extensions are used to add more color to a basic triad. On the present invention, the seventh chord used is actually a dominant seventh, but is so common they are usually just referred to as the seventh chord. A seventh chord is a Major triad with a flat or lower seventh note added on the end. It is the flat seventh that give these chords are bluesy sound. So they are typically used in Blues and Jazz music. On the present invention, seventh chords are represented by the small blue dots of the plurality of sevenths chords indicators 731 in the shaded area of the chords section 7. A minor seventh chord is a minor triad with a flat or lower seventh note added on the end and is represented by the small light blue dots of the plurality of minor sevenths chords indicators 741 in the shaded area of the chords section 7.

An inversion chords is simply just changing the order of notes in a chord. This is done to make certain chords easier to play. Sometimes inversion chords are also played to make chords more convenient to play in a chord progression. A chord progression is a series of chords played together. Changing the order of notes in a chord can make chords sound slightly different, but they will still keep the overall feel of the chord. For example, it is known that a C Major chord is made from the first, third, and fifth notes of a C Major scale C E G. If the C note, the root, is taken and placed on the end, the result is E G C. EGC is the first inversion of the C Major chord. By taking the next note, E (the third), and placing it on the end, the resulting inversion chord is G C E. The G C E chord is the second inversion of the C Major chord. Three note chords can have two inversions and four note chords can have three inversion. The fretboard/keyboard chart included with your present invention, will help users find chords and inversions.

With the knowledge on how to use scales to build chords, the user can proceed on to building chord progressions to create a musical journey. Each note in a scale represents a root note of a chord, and each chord has a specific purpose depending on the scale degree. The most important of these scale degrees are the first, the fourth, and the fifth. If we use chords in these scale degrees, this is called a one, four, five chord progression. Thousands of songs have been written using different variations of a one, four, five chord progression. The Latin name for the first is the Tonic, the fourth is called the Subdominant, and the fifth is called the dominant. As exemplified by the Latin names, the fifth is called the dominant because of its importance. As seen on the present invention, all the dots that lineup in the first position can also be seen lined up in the fifth position. There is a close relationship between the first and fifth because they share some of the same notes. To change to another key or modulate, it is usually changed to the fifth due to the sharing of notes. However, the tonic is the most important scale degree since it is the key chosen to create a musical piece. If you look at a Major chord progression like a musical journey, the first or the Tonic is considered the home chord, and the fifth is considered the destination chord, and all other chords represent the journey to and from. If a Major chord progress is seen as musical journey, the first or the tonic is considered the home chord and the fifth is considered to be the destination chord. All the other chords in the chord progression represent the journey to and from. All the other notes in a scale and the chords represented in the chord progression are called diatonic triads. Diatonic triads help music composers to create a much fuller journey. If we are creating a Major chord progression, the first, fourth and fifth will be Major chords. The second, third, and sixth will be minor chords, and the seventh will be a diminished chord. On the present invention, diatonic triads are indicated by a plurality of diatonic triad chord indicators 11 positioned on the plurality of Major notes indicators 611 and the plurality of minor notes indicators 621. The plurality of diatonic triad chord indicators 11 are represented by the capital M for Major chords, the lower case m for minor chords, and diminished chords by the small o inside the dots of the major and minor scale. As one can see on the minor scale it is the opposite. The one, the four, and the five are minor chords, the diminished chord is moved from the seventh to the second, so now the third, sixth, and seventh are Major chords. With all of the different chord changes available the chord leading chart 31 positioned on the rear of the outer wheel 1 comes in handy. The principle idea in chord leading is that chords naturally lead to other chord depending on where they are in the scale, as in their scale degree. The first can lead to any chord since it is the tonic, the home chord. If the fifth chord is played first followed directly by the destination chord and then attempt to follow it with another chord from the scale, the chord progression does not provide a sense of satisfaction. This is because the fifth naturally leads back to the first. Once a chord progression has reached its destination, the journey does not feel complete until it has returned home. This is the most important rule in chord leading. However, this does not mean the chord progression is required to finish on the fifth, or the first. It is important to remember that the chord leading rules are not written in stone. Users must trust their own ears and go with what sounds good. The chord leading chart 31 is positioned on the back of the outer wheel 1 of the present invention for users to use as a reference. Some simple chord progressions can be created just using the first, the fourth and fifth scale degrees. The Major scale in the key of C can be used to make an example chord progression. By using the present invention, the C would be the first, F would be the fourth, and G would be the fifth. The smallest type of progression is a two chord progression.

The following is a manual for creating some sample chord progression:

Let's begin with the first a C Major, then play the fourth an F Major, they sound good together. Let's try going from the first, a C Major to the fifth a G major. Both these two chord progressions sound really well together, but when you begin to incorporate diatonic triads you get a much larger variety of chords you can combine. Try playing a C Major chord along with an A minor chord just repeated over and over and it's easy to see how there are many songs today that are based on only two chords. But now let's try a three chord progression, of course the one, four, five, C F G The one, four, five chord progression is a great rolling progression used mostly in rock 'n roll and blues and is one of the most popular chord progression today because of its natural flow and sense of direction. Let's make a four chord progression from a one, four, five progression by adding an extra tonic in between the four and five. That would be C F C G. Let's make it a little more interesting by adding a seventh to the fifth. That would be C F C G7. Be careful when adding sevenths, remember the sevenths are actually a flat seventh and still need to fit into the scale. This is why seventh chords fit better in a minor scale or blues scale. Now we will create a chord progression using Diatonic triads, and chord leading. So let's begin with the first, the tonic. We know that the first can lead to any chord and the obvious choice would be the fourth, but let's try something different, let's choose the sixth. As you can see from our chart, chords can lead to more than one chord. The sixth can lead to the second, the fourth, the fifth, and the first, we will choose the fourth. And from our chord leading chart 31 we can see that the fourth can lead to the first, the third, the fifth, and the seventh. Let's choose the fifth because the fifth always leads back to the first to end our progression. The scale degrees we have chosen are the first, the sixth, the fourth, and fifth. We can see by looking at our Music Maestro using the Major scale in the key of C, that the first would be a C Major chord, the sixth would be an A minor chord, the fourth would be a F Major chord, and the fifth will be a G Major chord. So are chord progression would be:

C Major A minor F Major G Major

Try playing this chord progression. You can tell these chords go together rather nicely. But what if we would have chosen scale degrees differently. Let's see what other chord progressions we could come up with. We'll start off what are tonic, and next will still go to the sixth. And as you can see on our chart the sixth can lead to the second, fourth, fifth, and first. Last time we chose the fourth, this time will choose second. As seen on the chord progression chart, the second leads to the fourth, fifth, and seventh. Let's just stay with the fifth to keep things simple. So the scale degrees we have chosen are the first, the sixth, the second, and the fifth. This time we can see that our F Major is replaced by a D minor. So are chord progression would be:

C Major A minor D minor G Major

Both of these chord progressions have a nice rolling feel to them. Next is not only a great way to experiment with diatonic triads, but is a method that can also be used as a template to compose your own music on keyboards. We know that in the key of C major there are no sharps and flats, so we only use the white keys. If we use the black keys for landmarks we know that a C note is the white key to the left of the two black keys. With your left hand place either your middle finger or ring finger which ever feels more comfortable on the C note. The finger you have chosen will be a guide for the root notes of every chord. The two other notes in this chord will be added in thirds, which basically just means every other note in the scale. So we skipped the note next to the C and then with our first finger play the note that follows which is an E note. Then we skip the note next to the E and play the one that follows with our thumb which is a G note, this a C Major chord. We keep the same finger position for all the other chords. It's just three notes separated by two notes, every other note it's that simple. If we then move to the note that is to the right of C which is D with our guide, root finger, and then play every other note, this is a D minor chord. If we keep moving to the right to the next note which is E, and then play every other note this is an E minor chord. As you can see if we continue we will see all the diatonic triads of a C Major chord progression. Go ahead and experiment as long as you keep your finger position in thirds, all seven chords will stay in key. And always be aware of the positions of the first, fourth, and fifth. Feel free with your right hand to play a little melody, as long as you play only the white keys you really cannot hit a bad note. You can use this method as a template to create a piece in any key simply by keeping track of what scale degrees you use. And then you can use your Music Maestro to transpose those scale degrees to any key. Here's an example, let's create a C major chord progression using diatonic triads and chord leading on keyboards. We will start with the first which can go to any chord, let's choose the third. We know from looking at our chord leading chart 31 that the third can lead to the second, fourth, and the sixth, let's choose the sixth. We can see that the sixth can lead to the second, fourth, fifth, and the first, let's choose the fourth. So we have chosen the first, the third, the sixth and the fourth. We can tell by looking at our Music Maestro that these chords would be:

C Major E minor A minor F Major

Now to transpose these chords to another key. For practical reasons let's choose the key of G. Take the first position of your Music Maestro and align it with the G. We know the scale degrees we chose were the first, third, sixth, and fourth. If we now look at the symbols inside the red dots of the major scale, we can easily see our chord progression transposed in the key of G. Our chord progression would be:

G Major B minor E minor C Major

If you play both progressions, they sound like they go together even though they are in different keys. This is because we decided to transpose to the key of G which is the fifth of C. As you can see both keys use some of the same chords because they share some of the same notes. So it's only logical if you choose to change to another key, you've modulate to the fifth. This method of composing on keyboards can also be used to compose minor progressions. This is because the relative minor of C Major is A minor. So yes the A minor scale uses the exact same notes and chords of a C Major scale, and yes this can be confusing. Without making this to complicated, if you take a Major scale formula and divide it between fifth and sixth interval. Then take the divided half and place it in front, you now have a natural minor scale formula. This is what it looks like:

W W H W W/W H C D E F G/A B C Major scale

W H/W W H W W A B/C D E F G A minor scale

So the order of whole steps and half steps stays the same, with a different starting point. It's because of this that each Major scale will share the same tones of a specific minor scale. To find the relative minor scale of any Major scale simply counts three half steps flat. In the key of A minor on keyboards just like they key of C Major, it works out that you only used the white keys and you use the same chord positions as before, but now focusing our attention on the one, four, and five in the key of A minor, which is:

A minor D minor E minor

What about minor chord progressions, do they follow the same chord leading rules? Yes if you choose to stay within a one, four, five chord progression, which is what many musicians choose to do, avoiding Major chords entirely or only using them occasionally. Staying within a one, four, five minor chord progression can still be very rewarding since we are more at liberty with using sevenths chords, which always add a nice bluesy touch. Or there is another approach where you can use your diatonic triads as a high point in your musical piece, like a chorus. This works really well since the nature of a minor chord is mournful, and Major chords are uplifting. When using this approach, chord leading rules are far less set. This section has only covered a small part of the possibilities. Only you can decide how long to stay on one chord before proceeding to the next chord and the arrangement of chords. By using chord extensions and diatonic triads the possibilities are truly only limited by your imagination and creativity.

The present invention can also be used for other instruments. The same chords and scales do not differ for each instrument. In reference to FIGS. 6-9, the present invention also comprises a piano key chart 21, a piano key labeler 22, a guitar chord chart 23, and a guitar minor pentatonic scale chart 24. The included charts available are simple references for notes on a keyboard and a guitar. The present invention is able to teach users to learn the scales and chords on any instrument. Once that is learned, they are able to learn the chord progressions to create their own musical pieces.

Figure 9:
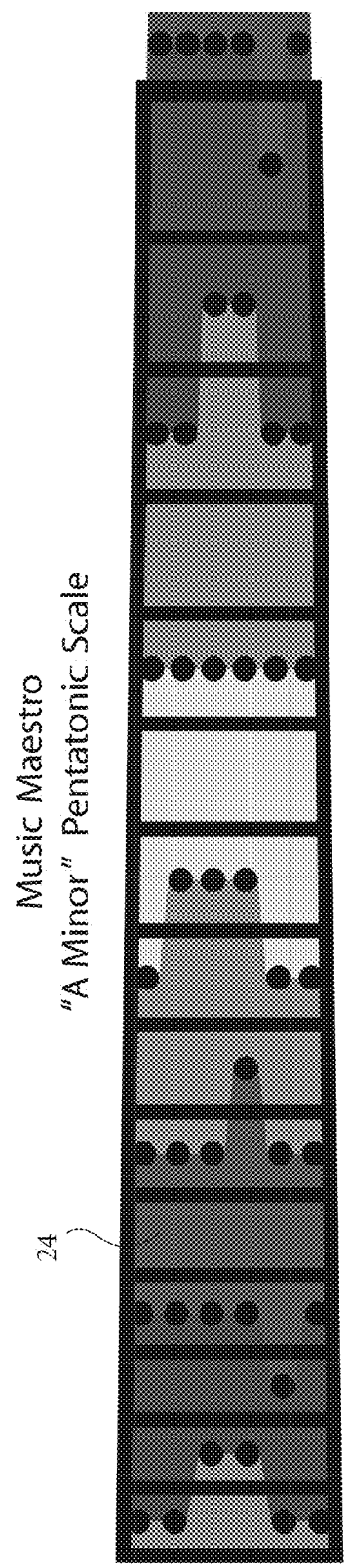
FIG. 9 is the guitar minor pentatonic scale chart included with the present invention.

Harmonization is frequently used to create musical piece. The triad chords are a great tool in helping a composer to create harmony in a musical piece. For this purpose, the use of the diatonic triad chord indicators 11 is convenient. The definition of harmonizing is to combine pleasingly. Whether a bass line, guitar solo, voice, or a melody is added to a musical piece, everything has to stay in key using the appropriate scale to remain pleasing. But does one have to use the same scale for creating a harmonizing chord progression? For the most part Major scales go with Major chords progressions and minor scales go with minor chords progressions. However, there are exceptions to this. For example, you can play a blues scale against a one, four, five Major chord progression in a blues structured song. To find the appropriate scale to use, always take into consideration what type of music is being creating and what chords have been used. If creating a country type song that uses a Major chord progression, the pentatonic scale is the most preferable. Or if many seventh chords are being used, one might want to use a blues scale. Most musicians will agree, to be a well-rounded music composer, it is important to be familiar with Major and minor scales in all keys. On piano this can be somewhat difficult because a Major and minor scale for each key have totally different sets of patterns. However, by starting out with concentration on the most popular keys A, C, E and G, the process is simplified. It is a good idea to learn Major and minor scales at least in these keys before proceeding to other keys. A user can use the present invention and the piano key chart to keep track of learned chords and scales. Guitar players on the other hand may have an easier time. This is because once a specific scale pattern is learned, it is just a matter of shifting these patterns to a new position on the fret board when changing keys. A great way to start the process of learning scale patterns on guitar is to learn the minor pentatonic scale. Once the minor pentatonic scale is mastered, the Major pentatonic scale is also the same pattern moved to a different position on the fret board. Major and minor pentatonic scales use five of the original seven notes from a Major and minor scale. The minor pentatonic scale on guitar has five distinct boxes that cover entire fret board, as shown in FIG. 9. These boxes are created from transposing notes all along the fret board. So far everything we have done has been in the key of C. For learning the minor pentatonic we are going to use the key of A. The A key is a great key to begin learning due to its central position, which will give a better understanding of how to use the colored boxes that are on each side of the first box. The first box is the center yellow box. You may have seen these boxes that make up the minor pentatonic scale in magazines or books, but really never absorb them. This is because seeing them in a magazine is not the same as putting them into practical use. A simple tried and proven method that actually works is to place these patterns directly on your guitar. The present invention comes with a set of unique stickers which will easily show you all five boxes. A simple color spectrum was selected to represent the five boxes. Taking advantage of the brightness, the first box is highlighted with yellow. The colors do not represent any color/note relationship or association. The first box represented by yellow is the most important of the boxes and marks what key the user is in. The second box represented by orange is behind the first box toward the headstock. The third box represented by green is in front of the first box toward the body. The color coding continues a back-and-forth pattern by designating the fourth box represented by red towards the headstock adjacent to the orange box. The sticker that is to be placed directly on the headstock is part of the fourth box and shows what open strings are to be used in the scale. The fifth and final box is represented by the color blue is once again in the other direction. As shown on FIG. 9, the twelfth fret is exactly the same as the sticker that is placed on the headstock. The boxes then start repeating themselves as shown to you by us adding the fourth box. This back-and-forth pattern, used to designate boxes, is used simply to get the user acquainted with the boxes on either side of the first box. The number designation for each box has no relevance to its importance. Some guitar players might be reluctant to place these stickers on their prized guitar. If the user has any reservations, they may choose to place them on an older guitar or a rarely used guitar. The glue residue on the stickers is very minimal and can be cleaned off with a little soapy water. Another method that works efficiently to remove the stickers is to gently heat the stickers with a blow dryer. The purpose of these stickers is to memorize the patterns, which can be easily done within a few weeks. Once the patterns have been memorized, the stickers can be removed. This is because it would be extremely difficult to shift these patterns to another key with the A minor pentatonic scale still in place. But the user is required have all the boxes memorized before removing the stickers. Some users vary in time length for learning the patterns. In reference to FIG. 9, for the first box, the pattern starts on the fifth fret, where the top sixth string and bottom first string are both A notes. On the fifth fret, the dots are shown on all strings of the guitar. This position will mark the key the minor pentatonic is in. The user must try to play all the notes in order from top to bottom and bottom to top until the entire box has been memorized. Once memorized, the user can try experimenting with alternating notes. A good example of how to alternate notes on different strings is to first play the note on the sixth string eighth fret followed by the note on the fourth string fifth fret, the note on the fifth string seventh fret. This type of pattern can be played anywhere in all the boxes. Other tablatures can present more complex methods of going through the boxes from bottom to top. An easy way to connect the boxes is to simply slide notes that connect each box. There are many ways to approach these boxes. By experimentation with different methods, the user can come up with personalized patterns. The boxes presented in FIG. 9 are notes from the A minor pentatonic scale. As stated earlier that the fifth fret which is part of the first box, has A notes on the top and bottom string and also has notes on every string, marks the position of what key the scale is in. To change to a G minor pentatonic, the same position can be taken and moved to the third fret, which has G notes on the top and bottom strings. Moving all the boxes over two frets might seem a little confusing especially when looking at the dots that are on the guitar that mark the third, fifth, seventh, and ninth frets. This is why it is so important to make sure that all the box patterns are memorized. Once the box patterns are memorized shifting these boxes to other positions becomes an easy task. For a C minor pentatonic scale, the pattern in the first box can simply align to the eighth fret where there is a C note on the sixth and first strings. The minor pentatonic scale is the most convenient pattern to learn due to the pattern layout of the first box. When playing a Major pentatonic scale the box that was designated as the first box is changed. As stated earlier, the minor pentatonic scale and major pentatonic scale is the same pattern. Instead of changing the designation for the boxes of the Major pentatonic scale, which can be confusing, it is much simpler to just shift the minor pentatonic scale to a different position. To find a Major pentatonic scale for a major chord progression, simply take the key that the major chord progression is in and can count three notes or frets flat. For example, if playing a major chord progression in the key of G, and then count three notes flat to the E key. Resultantly, the E minor pentatonic scale is played along with a G major progression. Another example, if playing a C major progression, count three notes flat from C to obtain an A key. To play along with a major chord progression in the key of C an A minor pentatonic scale is used.

Although the invention has been explained in relation to its preferred embodiment, it is to be understood that many other possible modifications and variations can be made without departing from the spirit and scope of the invention as hereinafter claimed.

What is claimed is:

1. A musical learning aid comprises,
an outer wheel;
an inner wheel;
a pivot fastener;
a piano key chart;
a piano key labeler;
a guitar chord chart;
a guitar minor pentatonic scale chart;
the outer wheel comprises a front side, a back side, an outer pivot hole;
the inner wheel comprises a scale section, a chords section, a scale degree indicator, a plurality of half interval dividers, a inner pivot hole, and a plurality of diatonic triad chord indicators;
the scale section comprises a major scale circle, a minor scale circle, a blues scale circle, and a pentatonic scale circle;
the chords section comprises a major chords circle, a minor chords circle, a sevenths chords circle, and a minor seventh chords circle;
the scale section being circularly shaped and enveloping the chords section;
the chords section being circularly shaped and being enveloped by the scale section.

2. The musical learning aid as claimed in claim 1 comprises,
the plurality of half interval dividers being lines equally distributed in radial relationship on the inner wheel;
the scale degree indicator being positioned in concentric relationship to the chords section and being defined by the plurality of half interval dividers;
the inner pivot hole being centered and being a hole traversing through the inner wheel.

3. The musical learning aid as claimed in claim 2 comprises,
the major scale circle, the minor scale circle, the blues scale circle, and the pentatonic scale circle being positioned in concentric relationship to each other;
a plurality of major notes indicators being disposed along the major scale circle between the plurality of half interval dividers;
a plurality of minor notes indicators being disposed along the minor scale circle between the plurality of half interval dividers;
a plurality of blues notes indicators being disposed along the blues scale circle between the plurality of half interval dividers;
a plurality of pentatonic notes indicators being disposed along the pentatonic scale circle between the plurality of half interval dividers;
the plurality of diatonic triad chord indicators being positioned on the plurality major notes indicators and the plurality of minor notes indicators.

4. The musical learning aid as claimed in claim 3 comprises,
wherein the plurality of major notes indicators are disposed in a major scale pattern formula;
wherein the plurality of minor notes indicators are disposed in a minor scale pattern formula;
wherein the plurality of blues notes indicators are disposed in a blues scale pattern formula;
wherein the plurality of pentatonic notes indicators are disposed in a pentatonic scale pattern formula;
wherein the plurality of diatonic triad chord indicators are represented by uppercase M's for major chords, lower case m's for minor chords, and lowercase o's for diminished chords.

5. The musical learning aid as claimed in claim 2 comprises,
the major chords circle, the minor chords circle, the sevenths chords circle, and the minor seventh chords circle being positioned in concentric relationship to each other;
a plurality of major chords indicators being disposed along the major chords circle between the plurality of half interval dividers;

a plurality of minor chords indicators being disposed along the minor chords circle between the plurality of half interval dividers;

a plurality of sevenths chords indicators being disposed along the sevenths chords circle between the plurality of half interval dividers;

a plurality of the minor seventh chords indicators being disposed along the minor seventh chords circle between the plurality of half interval dividers.

6. The musical learning aid as claimed in claim 5 comprises, wherein the plurality of major chords indicators are disposed in a major chords pattern formula;

wherein the plurality of minor chords indicators are disposed in a minor chords pattern formula;

wherein the plurality of sevenths chords indicators are disposed in a sevenths chords pattern formula;

wherein the plurality of minor sevenths chords indicators are disposed in a minor seventh chords pattern formula.

7. The musical learning aid as claimed in claim 1 comprises, the front side comprises an octave of notes and inner wheel circle;

the octave of notes being evenly and circumferentially distributed about the front side of the outer wheel;

the inner wheel circle being defined by the octave of notes;

the inner wheel circle being a blank circle sized to correspond to the inner wheel;

the back side comprises a chord leading chart;

the outer pivot hole being centered and being a hole traversing through the outer wheel.

8. The musical learning aid as claimed in claim 1 comprises, the inner wheel being fastened to the outer wheel by the pivot fastener;

the inner wheel being pivotable about the pivot fastener;

the pivot fastener fastening the inner wheel to the outer wheel by means of being inserted through the inner pivot hole and the outer pivot hole.

9. A musical learning aid comprises, an outer wheel;

an inner wheel;

a pivot fastener;

a piano key chart;

a piano key labeler;

a guitar chord chart;

a guitar minor pentatonic scale chart;

the outer wheel comprises a front side, a back side, an outer pivot hole;

the inner wheel comprises a scale section, a chords section, a scale degree indicator, a plurality of half interval dividers, a inner pivot hole, and a plurality of diatonic triad chord indicators;

the scale section comprises a major scale circle, a minor scale circle, a blues scale circle, and a pentatonic scale circle;

the chords section comprises a major chords circle, a minor chords circle, a sevenths chords circle, and a minor seventh chords circle;

the scale section being circularly shaped and enveloping the chords section;

the chords section being circularly shaped and being enveloped by the scale section;

the front side comprises an octave of notes and inner wheel circle;

the octave of notes being evenly and circumferentially distributed about the front side of the outer wheel;

the inner wheel circle being defined by the octave of notes;

the inner wheel circle being a blank circle sized to correspond to the inner wheel;

the back side comprises a chord leading chart;

the outer pivot hole being centered and being a hole traversing through the outer wheel.

10. The musical learning aid as claimed in claim 9 comprises, the plurality of half interval dividers being lines equally distributed in radial relationship on the inner wheel;

the scale degree indicator being positioned in concentric relationship to the chords section and being defined by the plurality of half interval dividers;

the inner pivot hole being centered and being a hole traversing through the inner wheel.

11. The musical learning aid as claimed in claim 10 comprises, the major scale circle, the minor scale circle, the blues scale circle, and the pentatonic scale circle being positioned in concentric relationship to each other;

a plurality of major notes indicators being disposed along the major scale circle between the plurality of half interval dividers;

a plurality of minor notes indicators being disposed along the minor scale circle between the plurality of half interval dividers;

a plurality of blues notes indicators being disposed along the blues scale circle between the plurality of half interval dividers;

a plurality of pentatonic notes indicators being disposed along the pentatonic scale circle between the plurality of half interval dividers;

the plurality of diatonic triad chord indicators being positioned on the plurality major notes indicators and the plurality of minor notes indicators.

12. The musical learning aid as claimed in claim 11 comprises, wherein the plurality of major notes indicators are disposed in a major scale pattern formula;

wherein the plurality of minor notes indicators are disposed in a minor scale pattern formula;

wherein the plurality of blues notes indicators are disposed in a blues scale pattern formula;

wherein the plurality of pentatonic notes indicators are disposed in a pentatonic scale pattern formula;

wherein the plurality of diatonic triad chord indicators are represented by uppercase M's for major chords, lower case m's for minor chords, and lowercase o's for diminished chords.

13. The musical learning aid as claimed in claim 10 comprises, the major chords circle, the minor chords circle, the sevenths chords circle, and the minor seventh chords circle being positioned in concentric relationship to each other;

a plurality of major chords indicators being disposed along the major chords circle between the plurality of half interval dividers;

a plurality of minor chords indicators being disposed along the minor chords circle between the plurality of half interval dividers;

a plurality of sevenths chords indicators being disposed along the sevenths chords circle between the plurality of half interval dividers;

a plurality of the minor seventh chords indicators being disposed along the minor seventh chords circle between the plurality of half interval dividers.

14. The musical learning aid as claimed in claim 13 comprises,
    wherein the plurality of major chords indicators are disposed in a major chords pattern formula;
    wherein the plurality of minor chords indicators are disposed in a minor chords pattern formula;
    wherein the plurality of sevenths chords indicators are disposed in a sevenths chords pattern formula;
    wherein the plurality of minor sevenths chords indicators are disposed in a minor seventh chords pattern formula.

15. The musical learning aid as claimed in claim 9 comprises,
    the inner wheel being fastened to the outer wheel by the pivot fastener;
    the inner wheel being pivotable about the pivot fastener;
    the pivot fastener fastening the inner wheel to the outer wheel by means of being inserted through the inner pivot hole and the outer pivot hole.

16. A musical learning aid comprises,
    an outer wheel;
    an inner wheel;
    a pivot fastener;
    a piano key chart;
    a piano key labeler;
    a guitar chord chart;
    a guitar minor pentatonic scale chart;
    the outer wheel comprises a front side, a back side, an outer pivot hole;
    the inner wheel comprises a scale section, a chords section, a scale degree indicator, a plurality of half interval dividers, a inner pivot hole, and a plurality of diatonic triad chord indicators;
    the scale section comprises a major scale circle, a minor scale circle, a blues scale circle, and a pentatonic scale circle;
    the chords section comprises a major chords circle, a minor chords circle, a sevenths chords circle, and a minor seventh chords circle;
    the scale section being circularly shaped and enveloping the chords section;
    the chords section being circularly shaped and being enveloped by the scale section;
    the front side comprises an octave of notes and inner wheel circle;
    the octave of notes being evenly and circumferentially distributed about the front side of the outer wheel;
    the inner wheel circle being defined by the octave of notes;
    the inner wheel circle being a blank circle sized to correspond to the inner wheel;
    the back side comprises a chord leading chart;
    the outer pivot hole being centered and being a hole traversing through the outer wheel;
    the plurality of half interval dividers being lines equally distributed in radial relationship on the inner wheel;
    the scale degree indicator being positioned in concentric relationship to the chords section and being defined by the plurality of half interval dividers;
    the inner pivot hole being centered and being a hole traversing through the inner wheel;
    the inner wheel being fastened to the outer wheel by the pivot fastener;
    the inner wheel being pivotable about the pivot fastener;
    the pivot fastener fastening the inner wheel to the outer wheel by means of being inserted through the inner pivot hole and the outer pivot hole.

17. The musical learning aid as claimed in claim 16 comprises,
    the major scale circle, the minor scale circle, the blues scale circle, and the pentatonic scale circle being positioned in concentric relationship to each other;
    a plurality of major notes indicators being disposed along the major scale circle between the plurality of half interval dividers;
    a plurality of minor notes indicators being disposed along the minor scale circle between the plurality of half interval dividers;
    a plurality of blues notes indicators being disposed along the blues scale circle between the plurality of half interval dividers;
    a plurality of pentatonic notes indicators being disposed along the pentatonic scale circle between the plurality of half interval dividers;
    the plurality of diatonic triad chord indicators being positioned on the plurality major notes indicators and the plurality of minor notes indicators.

18. The musical learning aid as claimed in claim 17 comprises,
    wherein the plurality of major notes indicators are disposed in a major scale pattern formula;
    wherein the plurality of minor notes indicators are disposed in a minor scale pattern formula;
    wherein the plurality of blues notes indicators are disposed in a blues scale pattern formula;
    wherein the plurality of pentatonic notes indicators are disposed in a pentatonic scale pattern formula;
    wherein the plurality of diatonic triad chord indicators are represented by uppercase M's for major chords, lower case m's for minor chords, and lowercase o's for diminished chords.

19. The musical learning aid as claimed in claim 16 comprises,
    the major chords circle, the minor chords circle, the sevenths chords circle, and the minor seventh chords circle being positioned in concentric relationship to each other;
    a plurality of major chords indicators being disposed along the major chords circle between the plurality of half interval dividers;
    a plurality of minor chords indicators being disposed along the minor chords circle between the plurality of half interval dividers;
    a plurality of sevenths chords indicators being disposed along the sevenths chords circle between the plurality of half interval dividers;
    a plurality of the minor seventh chords indicators being disposed along the minor seventh chords circle between the plurality of half interval dividers.

20. The musical learning aid as claimed in claim 17 comprises,
    wherein the plurality of major chords indicators are disposed in a major chords pattern formula;
    wherein the plurality of minor chords indicators are disposed in a minor chords pattern formula;
    wherein the plurality of sevenths chords indicators are disposed in a sevenths chords pattern formula;
    wherein the plurality of minor sevenths chords indicators are disposed in a minor seventh chords pattern formula.

* * * * *